No. 893,559. PATENTED JULY 14, 1908.
C. A. YATES.
HYDROCARBON BURNER.
APPLICATION FILED JAN. 20, 1908.
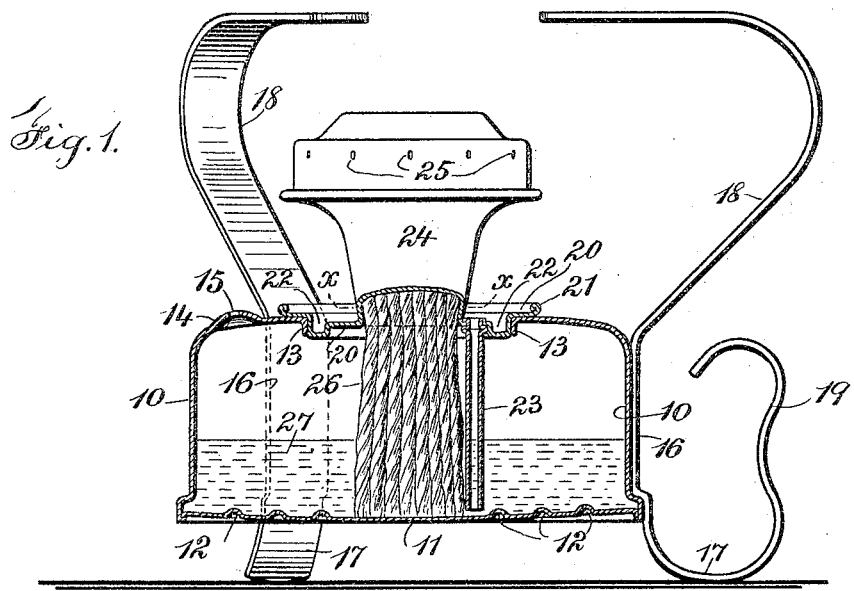
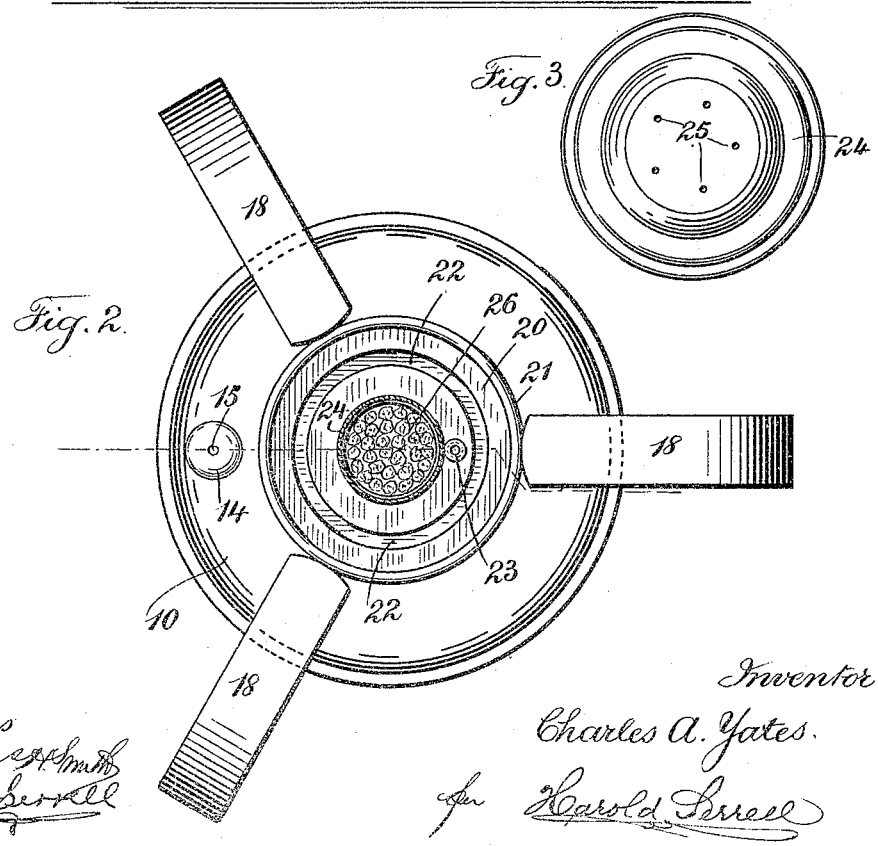
Witnesses
Cho H Smith
A H Serrell
Inventor
Charles A. Yates.
per Harold Serrell
his atty.

UNITED STATES PATENT OFFICE.

CHARLES A. YATES, OF NEW YORK, N. Y., ASSIGNOR TO THOS. W. HOUCHIN CO., OF NEW YORK, N. Y., A CORPORATION OF NEW YORK.

HYDROCARBON-BURNER.

No. 893,559.          Specification of Letters Patent.          Patented July 14, 1908.

Application filed January 20, 1908. Serial No. 411,572.

*To all whom it may concern:*

Be it known that I, CHARLES A. YATES, a citizen of the United States, residing in the borough of Bronx, city, county, and State of New York, have invented an Improvement in Hydrocarbon-Burners, of which the following is a specification.

This invention relates to a burner in which alcohol or other hydrocarbon or liquid fuel is utilized and as is usual in burners of this type, a certain quantity of the liquid fuel is employed and caused to burn exteriorly of the burner member of the apparatus to initially heat the same to a temperature sufficient to effect the vaporization or volatilization of the liquid fuel. Now as is well understood, this liquid fuel which is used initially to heat the burner member, unless regulated properly in quantity and confined within designated limits, is likely to flow over the sides of the burner or reservoir and to drop therefrom, and furthermore, when this occurs, upon the ignition of the liquid fuel so employed, the flame therefrom will follow the liquid, wherever the same has happened to flow and this naturally is likely to cause fires of greater or less seriousness.

Now the object of my invention is the provision of an alcohol burner in which the quantity of liquid fuel employed to start the burner may be supplied from the reservoir of the device and regulated to the required quantity for effecting the initial volatilization or vaporization of the liquid fuel, any excess in this supply being permitted to return to the reservoir.

In carrying out the invention, my improved alcohol burner preferably comprises a reservoir, supports therefor, a cover for the reservoir, a burner connected to the cover and means whereby a quantity of liquid fuel from the reservoir is supplied to the cover for starting the burner and any excess in this supply is automatically returned to the reservoir, as hereinbefore stated and as will be hereinafter particularly described.

In the drawing, Figure 1 is a central vertical section and partial elevation of my improved hydrocarbon burner. Fig. 2 is a plan and partial section taken on line *x*, *x*, Fig. 1, and Fig. 3 is a plan view of the burner member of the device.

Referring particularly to the drawing, 10 designates a reservoir which is preferably made of metal and while shown as cylindrical, may be of any desired conformation. This reservoir includes a bottom member 11, slightly convex and preferably provided with a series of circular stiffening ribs 12 and made of thin metal, so as to be flexible or easily yielding. The upper portion of the reservoir is provided with a central aperture having an internal flange 13. In the upper part of the reservoir 10, I also provide a raised portion indicated at 14, provided with a suitable aperture 15, whose function will be hereinafter set forth.

Secured exteriorly to the reservoir 10, preferably in equally spaced apart positions, are support members 16, the lower portion 17 thereof extending as legs upon which the burner apparatus rests, while the upper portions 18 extend above the reservoir and are so shaped as to be adapted to support a vessel containing the material to be heated. One of these members 16 may be extended at the lower portion thereof and shaped to form a handle, as indicated at 19 in Fig. 1. I also employ a cover member 20 comprising an exterior flange 21 and an annular gutter 22, the diameter of the gutter being such that the outer wall thereof is adapted to fit within the flange 13 in the upper part of the reservoir 10 to close the central opening therein. The cover member 20 is provided with a tube or pipe connection 23 extending through the same immediately within the gutter 22 and extending therefrom to the point adjacent to the bottom member 11 of the reservoir. The cover member 20 is also provided with a burner member 24 secured centrally therein and provided with apertures 25 in both the sides and top thereof, from which the vaporized or volatilized liquid fuel escapes and burns, the burner member 24 being fitted with a wick 26, by the capillary action in which, the liquid fuel 27 contained in the reservoir is conveyed to the vaporizing chamber in the burner member 24.

Now in the use of the hereinbefore described hydrocarbon burner, a thumb or finger is placed over the hole 15 and raised portion 14 at the top of the reservoir 10 and with the same or the other hand, the flexible or yielding bottom 11 of the reservoir is pressed in, whereby as will be understood, through the confinement of the air in the reservoir above the liquid fuel, a certain amount of this liquid fuel will be forced through the tube 23 into the gutter 22 surrounding the burner member 24 in the cover 20 and it will be further apparent that upon removing the finger from the aperture 15, that any surplus of liquid fuel which may thus have been supplied to the gutter 22, will be returned by gravity to the interior of the reservoir, the mouth or upper orifice of the tube 23 being so placed below the level of the flange 21 that a sufficient quantity of liquid fuel is retained in the gutter 22 to effect the initial operation of the burner, the gutter 22 being so formed as to hold such a quantity of the liquid fuel and this being the case, it will be apparent that any excess in this supply to the gutter 22 will return automatically to the reservoir by way of the pipe 23.

I claim as my invention:

1. A liquid fuel burner comprising a reservoir having a flexible bottom member and an apertured top, a removable burner member having a wick and a receiving base, adapted to be received in the top and closing said aperture, a tube secured to said base and extending to near the bottom of the reservoir and by which the initial operation of the burner is effected.

2. A liquid fuel burner comprising an apertured sheet metal reservoir having a part thereof yielding to applied pressure, a removable burner member having a wick and a receiving base adapted to be connected at the aperture of the reservoir and to close the same, means connected to the base and through which applied pressure will force a small quantity of fluid for effecting the initial operation of the burner.

3. A liquid fuel burner comprising a reservoir having a yielding bottom member and a raised portion in the top of said reservoir provided with an aperture, a cover member comprising an annular gutter and a flange member surrounding said gutter, a tube secured to the said cover member immediately within the said gutter thereon and extending therefrom to a point adjacent to the bottom member of the said reservoir, a burner member connected to the said cover and a wick extending from the said burner member into the said reservoir.

Signed by me this 13th day of December, 1907.

CHARLES A. YATES.

Witnesses:
F. C. GRISWOLD,
A. A. NESBITT.